United States Patent [19]

Tauscher

[11] 4,428,238

[45] Jan. 31, 1984

[54] VIBRATING TEST SCREENING APPARATUS

[75] Inventor: Robert Tauscher, Hacienda Heights, Calif.

[73] Assignee: Team Corporation, South El Monte, Calif.

[21] Appl. No.: 308,735

[22] Filed: Oct. 5, 1981

[51] Int. Cl.³ .............................................. B06B 3/00
[52] U.S. Cl. ...................................... 73/663; 73/665; 181/119; 137/625.65
[58] Field of Search ................. 73/663, 665, 666, 668; 181/119; 137/625.65

[56] References Cited

U.S. PATENT DOCUMENTS

| | | | |
|---|---|---|---|
| 2,706,400 | 4/1955 | Unholtz | 73/666 |
| 2,886,965 | 5/1959 | Kugler | 73/665 |
| 2,890,584 | 6/1959 | Dickie | 73/665 |
| 3,099,280 | 7/1963 | Holzbock | 137/625.65 |
| 3,840,090 | 10/1974 | Silverman | 181/119 |
| 4,040,445 | 8/1977 | McCormick | 137/625.65 |
| 4,147,228 | 4/1979 | Bouyoucos | 181/119 |
| 4,181,028 | 1/1980 | Talbott, Jr. | 73/665 |
| 4,265,331 | 5/1981 | Leonard | 181/119 |

FOREIGN PATENT DOCUMENTS

| | | | |
|---|---|---|---|
| 946589 | 1/1964 | United Kingdom | 73/668 |
| 823930 | 4/1981 | U.S.S.R. | 73/663 |

*Primary Examiner*—Howard A. Birmiel
*Attorney, Agent, or Firm*—Nilsson, Robbins, Daigarn, Berliner, Carson & Wurst

[57] ABSTRACT

Apparatus for subjecting a test specimen to vibrational forces has a base, a first preselected mass mounted for reciprocal movement relative to the base and a second preselected mass elastically coupled to the first mass to produce a resonant condition at a preselected frequency of reciprocal movement.

2 Claims, 11 Drawing Figures

VIBRATING TEST SCREENING APPARATUS

BACKGROUND OF THE INVENTION

The present invention relates to the vibrational testing art and, more particularly, to a resonant apparatus for subjecting a test specimen to vibrational forces.

There have heretofore been proposed a number of apparatuses for performing vibrational tests on manufactured items. One such apparatus incorporates a voice coil or other electrodynamic means for imparting vibrational forces directly to a test specimen. However, the electrodynamic structures of such devices are rather complex and require a large number of high technology components. They are thus expensive to manufacture and generally must be operated by a qualified engineer.

Another prior device consists of an electric motor driving a cam or an unbalanced weight arrangement for vibrating a specimen. However, the frequency of vibration produced by such devices is generally limited to approximately 60 hertz, and the acceleration imparted to a specimen is proportional to the speed of the motor. The vibrational forces produced thus vary significantly over the range of possible frequencies.

A further vibrational device comprises one or more air hammers impacting a plate to impart a series of impulses to a test specimen. However, this device is also quite expensive and produces an undesirably high level of noise. In addition, an operator of the device has very little control over the spectrum of vibrations produced.

Therefore, in many applications it is desirable to provide a relatively simple and inexpensive apparatus for subjecting a test specimen to preselected vibrational forces.

SUMMARY OF THE INVENTION

The present invention comprises an apparatus for subjecting a test specimen to vibrational forces, having: base means; first and second preselected masses; means for mounting the first mass for reciprocal movement relative to the base means; means for attaching a test specimen to the first mass for movement therewith; means for actuating the first mass reciprocally; and means for elastically coupling the second mass to the actuating means for reciprocal movement substantially with the first mass. The coupling means and the second mass are constructed and arranged to produce a resonant condition at a preselected frequency of reciprocal movement. The mounting means may include a first rod elastically coupling the first mass to the actuating means, and the coupling means may include a second rod elastically coupling the second mass to the actuating means. The first and second rods may extend substantially parallel to the direction of reciprocal movement.

The first and second masses are preferably threaded onto the first and second rods, respectively, and include means for locking the masses at preselected locations on the rods. The locking means may comprise a pair of collars threaded onto the respective rods, and means for urging the first and second masses axially relative to the collars.

The actuating means preferably comprises a piston and cylinder arrangement and means for controllably applying pressurized fluid thereto. The piston and cylinder arrangement may define first and second chambers on opposite sides of a piston, and the pressure application means preferably comprises a source of pressurized fluid and means for alternately applying the pressurized fluid to the first and second chambers. The means for alternately applying pressurized fluid may comprise a servovalve actuatable by a voice coil or other electrically operated means.

The hydraulic actuator of the present apparatus is substantially less expensive than the prior electrodynamic movements used for this purpose, yet it can operate to produce high levels of acceleration over a wide range of vibrational frequencies. Electrical inputs to the voice coil servovalve arrangement cause alternating pressure conditions to be applied to the actuator at any desired frequency up to and including approximately 4,000 hertz (4000 Hz). The frequency and magnitude of the electrical signals can be chosen to provide regular or random vibrations to the specimen, as desired, with a resonant condition occurring at a preselected frequency. The resonant frequency, preferably on the order of 2,000 hertz, is determined by the size of the second mass and the effective spring constant of the second rod or other elastic coupling means. These parameters can be programmed into the apparatus upon design or assembly, providing an operational "kick" at a preselected high frequency.

The apparatus of the present invention incorporates far fewer components, particularly high technology components, and employs a far simpler concept than the prior electrodynamic movements. It can be operated by anyone able to exercise judgment as to success of the test, including a production line worker. A test on the order of ten to fifteen minutes per unit is generally suitable for determining whether a part is defective.

The present apparatus is also relatively troublefree due to its simple construction. For example, the actuating mechanism is carried for reciprocal movement within a simple hydrostatic bearing, eliminating the need for high pressure seals or a more complex bearing arrangement. The hydrostatic bearing reduces friction and wear to a minimum.

The combined voice coil and sliding valve arrangement of the present invention is similarly inexpensive to manufacture and responds faithfully to a wide range of inputs. The voice coil may be cooled by a constant flow of air passed through the voice coil housing, the flow of air also serving to expel any hydraulic fluid leaking into the housing from the sliding valve. High frequency response of the apparatus is enhanced by a pair of shorted coils having a combined mass equal to that of the voice coil and establishing mutual inductance therewith.

The operation of the present apparatus may be constantly monitored and controlled through a plurality of accelerometers placed at various points relative to the first mass and the test specimen. The accelerometers are positioned asymmetrically to sense an average energy level across the mass and the specimen, and to avoid possible cancellation of the output signals therefrom. If the magnitude of the acceleration imparted to the first mass and the specimen becomes either greater or less than a preselected range of acceptable values, the apparatus may be automatically shut off to avoid damage.

BRIEF DESCRIPTION OF THE DRAWINGS

The above and other objects of the present invention may be more fully understood from the following description taken together with the accompanying drawings wherein similar reference characters refer to similar elements thoughout and in which.

DESCRIPTION OF THE PREFERRED EMBODIMENT

Figure 1:
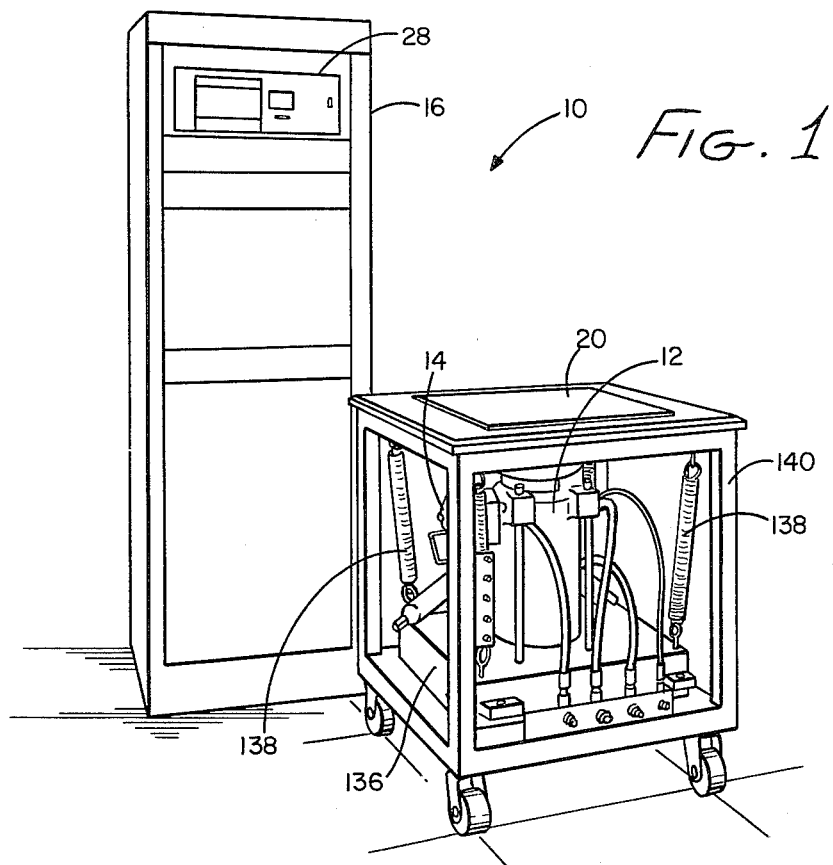
FIG. 1 is a perspective view of an apparatus constructed in accordance with the present invention.
Figure 2:
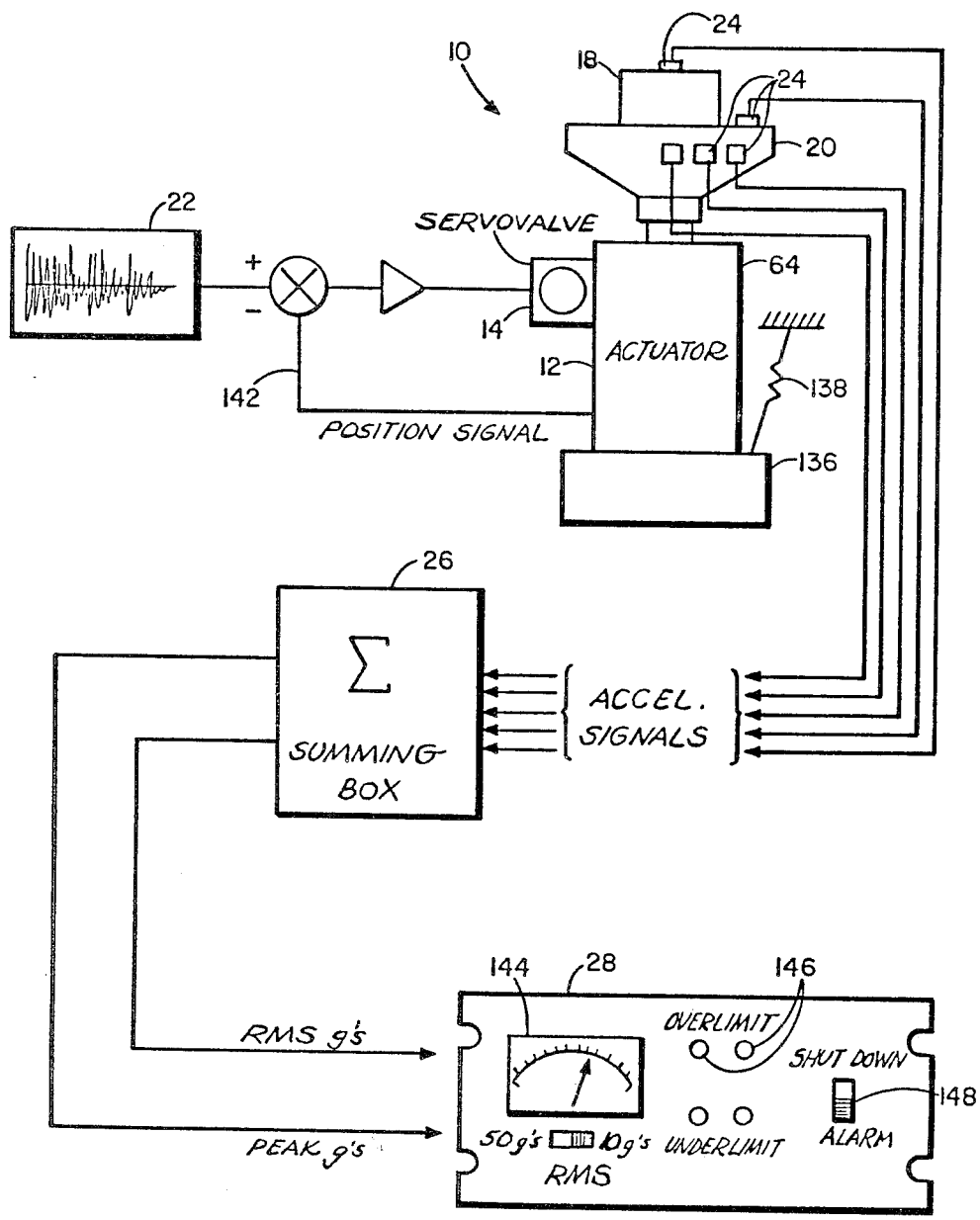
FIG. 2 is a schematic representation of the apparatus of FIG. 1.

Referring now to the drawings, there is illustrated in FIGS. 1 and 2 an apparatus embodying the present invention, generally designated 10. The apparatus 10 generally comprises a reciprocable actuator mechanism 12, an electrically operated servovalve for controllably applying fluid pressure to the actuator mechanism, and a control apparatus 16. A test specimen 18 is mounted to a table 20 fixed to one end of the actuator 12, and subjected to vibrational forces intended to reveal any latent defects in the specimen by causing the specimen to fail.

As indicated in FIG. 2, the frequency and magnitude of the vibrational forces are determined by a complex waveform 22 produced by the control apparatus 16. The acceleration of the specimen 18 and the table 20 during vibration is monitored by a plurality of accelerometers 24 connected to a summing box 26 and a display panel 28 of the control apparatus 16. The peak and RMS acceleration values are constantly monitored by the control apparatus to determine whether the operation of the apparatus 10 is within preselected limits. If not within limits, the control apparatus 16 either shuts down the apparatus 10 or sounds an alarm.

Figure 3:
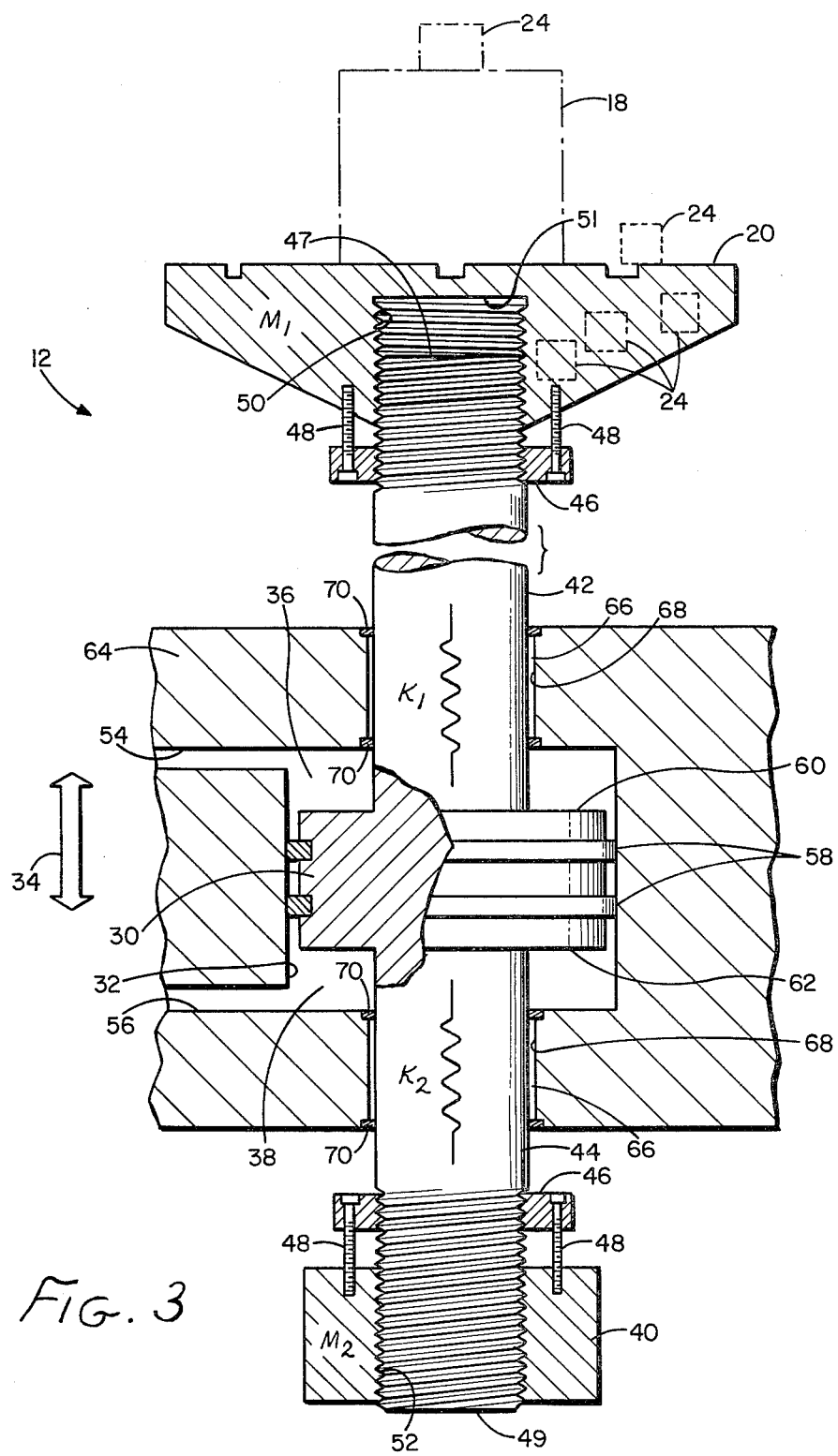
FIG. 3 is a somewhat diagrammatic vertical sectional view, partially broken away, of an actuator mechanism constructed in accordance with the present invention.

The actuator mechanism 12 is illustrated most clearly in FIG. 3, wherein a piston 30 is mounted for reciprocal movement within a cylinder 32 in the direction indicated at 34. Movement of the piston 30 is accomplished by alternately applying fluid pressure to chambers 36 and 38 on opposite sides of the piston. The table 20 and a secondary mass 40 are carried for reciprocal movement with the piston 30 by a pair of piston rods 42 and 44, respectively. The table 20 serves to mount the specimen 18 to the actuator mechanism, and the secondary mass 40 serves to tune the entire system to a preselected frequency to produce the acceleration profile shown in FIG. 4.

Figure 4:
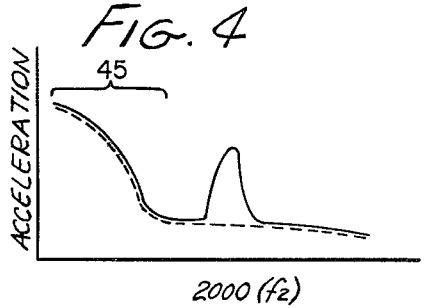
FIG. 4 is a somewhat generalized graphical representation of the acceleration profile of the actuator mechanism of FIG. 3.

The secondary mass 40 is coupled to the piston 30 by the piston rod 44, establishing a resonant frequency defined by the mass $M_2$ of the secondary mass 40 and the effective spring constant K of the piston rods. The spring constant K will, of course, depend upon the material, length and cross-sectional area of the rods. The resonant frequency provided by the secondary mass 40 and the piston rods is defined by the expression:

$$f_2 = \frac{1}{2\pi} \sqrt{\frac{K_2}{M_2}}, \text{ where } K = \frac{K_1 K_2}{K_1 + K_2}$$

and equals 2000 hertz in the case illustrated in FIG. 4. It represents a peak in the acceleration of the system, and therefore a peak in the level of vibrational energy imparted to the specimen 18. This effect is significant since the magnitude of the acceleration generally decreases with increasing frequency, as shown at 45 in FIG. 4. The resonance of the system enables a greatly increased level of acceleration to be obtained at the preselected frequency.

The resonant frequency $f_2$ is independent of the mass of the test specimen. The location of the peak in FIG. 4 will thus remain at 2000 hertz regardless of the mass of the specimen mounted to the table 20, but the height of the peak will be reduced somewhat by a large specimen mass. The decrease in height is due to the energy consumed in moving the specimen.

The mounting of the table 20 by the piston rod 42 also represents a spring-mass coupling, with a characteristic resonant frequency ($f_1$). The frequency $f_1$ is dependent upon the mass ($M_1$) of the table 20, the mass of the test specimen and the effective spring constant (K) of the piston rods. However, the mass $M_1$ is preferably approximately four times the mass of the secondary mass 40, causing the resonant frequency of the table 20 to be less than that of the secondary mass 40.

Figure 5:
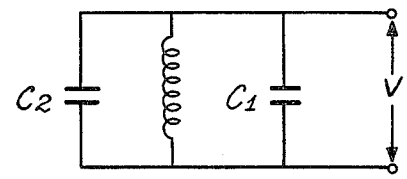
FIG. 5 is a schematic diagram of an electrical analog to the mechanical system of the actuator illustrated in FIG. 3.

The electrical analog to the mechanical coupled-mass system of the apparatus 10 is illustrated in FIG. 5. In the figure, the capacitors $C_1$ and $C_2$ correspond to the masses $M_1$ and $M_2$ of the apparatus 10 and establish corresponding resonant frequencies of the circuit.

The piston 30 and the rods 42 and 44 are preferably formed of a single body of steel or other suitable material. The effective spring constants $K_1$ and $K_2$ of the piston rods are thus determined by the cross-sectional areas and lengths of the rods.

Figure 6:
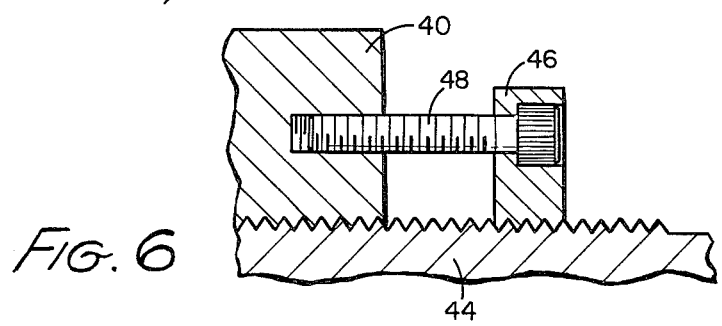
FIG. 6 is an enlarged fragmentary vertical sectional view showing a portion of the retaining collar arrangement of the actuator of FIG. 3.

The table 20 and the secondary mass 40 are threaded onto the outer ends of the respective piston rods, permitting the mass loading of the apparatus 10 to be adjusted to tune the apparatus to the desired resonant frequency. The table 20 and the mass 40 are locked in preselected positions on the piston rods by engagement with a pair of collars 46 threaded onto the ends of the respective piston rods. The details of one of the collars 46 are shown in FIG. 6 in relation to the secondary mass 40. Once the table 20 and the secondary mass 40 are properly located on the piston rods, the collars 46 are attached thereto by a plurality of bolts 48 which draw the table 20 and the mass 40 axially toward the collars. In this manner, intimate contact is obtained between the threads of the various parts, overcoming any variations within tolerances of the threads and establishing a strong frictional engagement therebetween. The table 20 and the secondary mass 40 are thus mounted to the two piston rods with a high degree of fixity, causing the actuator mechanism 12 to behave as if the table 20 and the secondary mass 40 were formed integrally with the piston rods.

In this regard, it should be noted that the threading engagements of the table 20 and the secondary mass 40 with the piston rods are designed such that flat outer ends 47 and 49 of the rods are not bottomed against either of the two mass elements. In the case of the table 20, a blind threaded opening 50 receiving the piston rod 42 is deep enough so that the outer end 47 of the piston rod is spaced from an inner end 51 of the opening when the table 20 is at the preselected location on the rod. This eliminates any unwanted vibrations which might result from the two ends abutting each other as the piston 30 is moved reciprocally. In the case of the secondary mass 40, a threaded opening 52 which receives the piston rod 44 may pass entirely through the mass 40 to avoid abutting contact of the mass with the outer end 49 of the piston rod. Alternatively, the opening 52 could be formed as a blind opening in the manner of the opening 50, with the inner end of the blind opening being spaced from the outer end of the piston rod.

Fluid pressure for reciprocation of the piston 30 is provided to the chambers 36 and 38 through fluid passages 54 and 56, respectively. The chambers 36 and 38 are separated by a pair of piston or packing rings 58 carried by the piston 30 for engagement with the walls of the cylinder 32. Fluid entering the chamber 36 through the passage 54 thus acts against a first annular surface 60 of the piston to urge it and the piston rods 42 and 44 downwardly in FIG. 3, simultaneously expelling fluid from the chamber 38. After a predetermined amount of fluid is introduced into the chamber 36, the process is reversed by introducing pressurized fluid through the passage 56 to the chamber 38. The pressure of this fluid bears against a second annular surface 62 of the piston, driving the piston upwardly in FIG. 3 and expelling the same amount of fluid from the first chamber 36.

The piston rods 42 and 44 are mounted for reciprocal movement with the piston 30 relative to a base 64 by a pair of hydrostatic bearings 66. The hydrostatic bearings 66 comprise generally a pair of aligned cylindrical cavities 68 within the housing 64, the cavities 68 being approximately 0.002 inches greater in diameter than the cylindrical outer surfaces of the piston rods. The annular spaces thus defined between the piston rods and the cavities 68 are filled with water or other suitable fluid (not shown). The fluid is confined within the spaces by annular fluid seals 70, producing an inexpensive and long-lasting fluid bearing.

Figure 7:
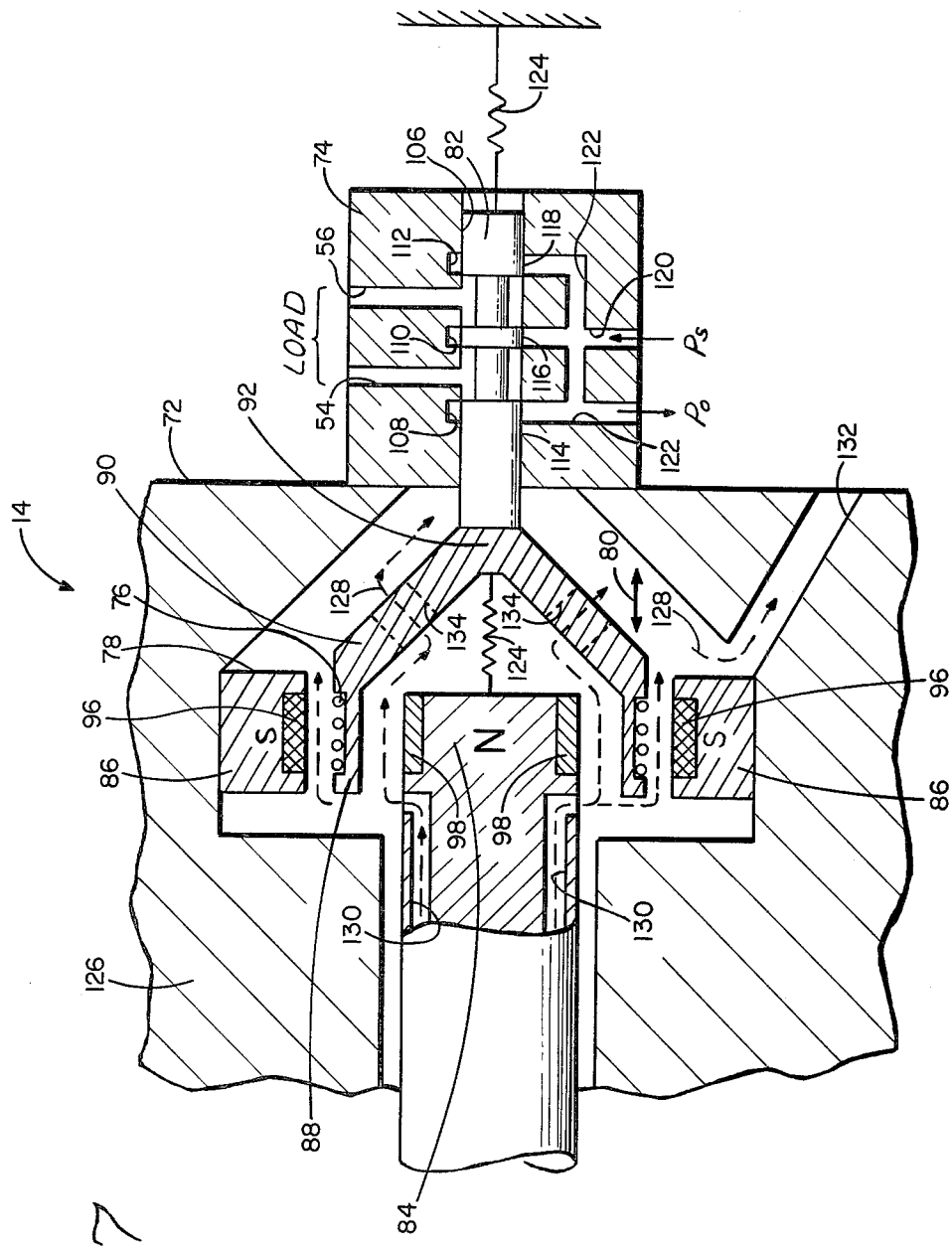
FIG. 7 is a somewhat diagrammatic fragmentary vertical sectional view of a servovalve constructed in accordance with the present invention.
Figure 7A:
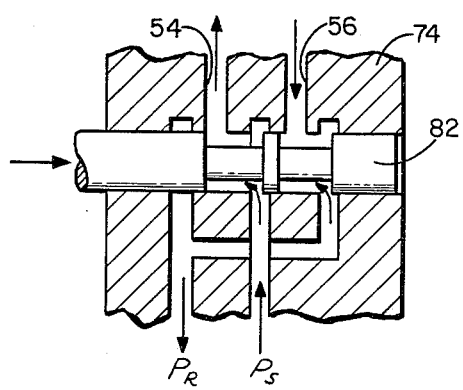
FIG. 7A is a fragmentary vertical sectional view of a spool valve arrangement of the structure of FIG. 7, showing the spool valve arrangement in a first open condition thereof.
Figure 7B:
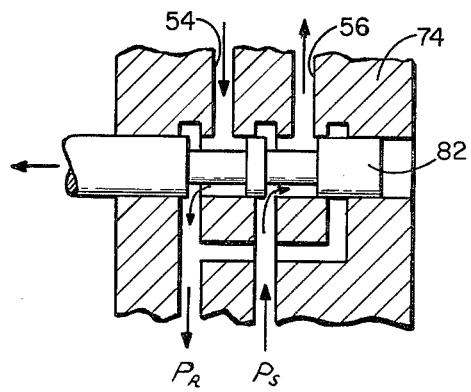
FIG. 7B is a fragmentary vertical sectional view showing the spool valve arrangement of FIG. 7A in a second open condition thereof.

The application of pressurized fluid to the passages 54 and 56 of the actuator mechanism 12 is accomplished with the electrically-operated servovalve 14 illustrated in FIG. 7. The servovalve 14 comprises generally a voice coil apparatus 72 for actuating a four-way sliding valve 74. The voice coil apparatus 72 comprises a voice coil 76 movable relative to a magnetic structure 78 in the direction indicated at 80 to actuate a spool element 82 of the valve 74 axially between the conditions of FIGS. 7A and 7B. In the configuration of FIG. 7A, pressurized supply fluid ($P_s$) is applied to the chamber 36 through the passage 54 as fluid is permitted to pass from the chamber 38 through the passage 56. The piston 30 and the masses $M_1$ and $M_2$ are thus driven downwardly as viewed in FIG. 3, producing an acceleration of the test specimen 18 in the same direction. When the voice coil 72 is actuated to slide the spool element 82 in the opposite direction to the condition of FIG. 7B, an opposite flow of fluid is produced in the passages 54 and 56. This flow drives the piston 30 and the masses $M_1$ and $M_2$ upwardly as viewed in FIG. 3, accelerating the test specimen 18 in that direction.

In operation, a series of alternating input signals are applied to the voice coil apparatus 72 to drive the actuator mechanism 12 alternately up and down. The rate of acceleration in each direction is determined by the axial displacement of the spool element 82 from the condition of FIG. 7, while the extent of vertical movement depends upon both the axial displacement of the spool element and the length of time it is held at that displacement. These two variables are controlled by the complex waveform 22 from the control apparatus 16. The table 20 and the test specimen 18 are thus subjected to a preselected series of rapid accelerations in opposite axial directions to simulate the vibrational environment to which the test specimen 18 will be subjected in its eventual use.

As seen most clearly in FIG. 7, the magnetic structure 78 may comprise a generally cylindrical north magnetic pole 84 surrounded by an annular south magnetic pole 86. The poles 84 and 86 are spaced radially from each other a preselected distance for reception of a hollow cylindrical end portion 88 of a movable cone structure 90. The voice coil 76 is carried on the cylindrical end portion 88, and a narrowed end portion 92 of the cone structure is mounted axially to the spool element 82. As alternating electrical signals are applied to the voice coil 76, the interaction of the magnetic field produced thereby with the magnetic field between the poles 84 and 86 causes the cone structure 90 and the spool element 82 to oscillate axially.

In a standard voice coil type of structure, the impedance of the coil circuit increases substantially with increased frequency. The increase in impedance is illustrated generally in FIG. 8 by the broken line curve 94, and would seriously limit the response of the voice coil apparatus 72 at high frequencies. This problem is overcome in the apparatus of FIG. 7 by the addition of a single turn of copper 96 on the south magnetic pole and a single turn of copper 98 on the north magnetic pole, causing the shorted coil concept to be applied to the apparatus. The amount of copper in the turns 96 and 98 is selected to equal the amount of copper in the voice coil 76, causing a mutual inductance to be established therebetween. When such occurs, the increase in impedance with frequency levels off in the manner shown by the full line curve 100 of FIG. 8. The amount of power consumed at high frequency is limited by the limitation of impedance, permitting the servovalve 14 and thus the apparatus 10 to operate effectively at higher frequencies.

Figure 8:
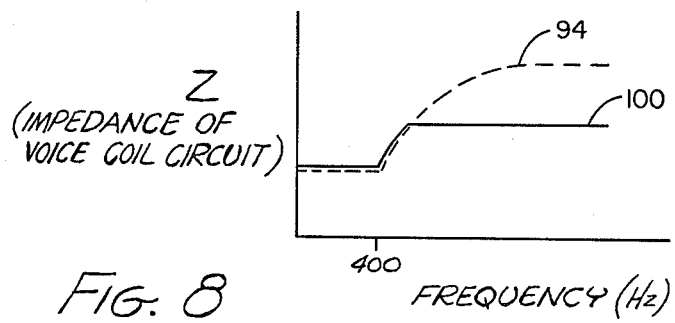
FIG. 8 is a somewhat generalized graphical representation of the impedance profile of a voice coil circuit constructed in accordance with the present invention; and, FIG. 9 is a somewhat generalized graphical representation of the fluid flow profile of a servovalve constructed in accordance with the present invention.
Figure 9:
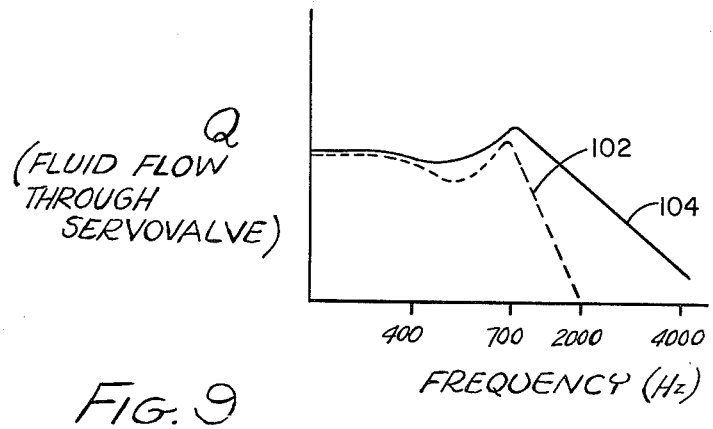

The enhanced flow of hydraulic fluid achieved by utilization of the shorting turns 96 and 98 is illustrated in FIG. 9. Again, the normal operational characteristics are shown by a broken line curve 102 and the change through utilization of the turns 96 and 98 is shown by the full line curve 104. As shown, there would be essentially zero flow at a frequency of 2,000 hertz without the shorting turns, because the power applied to the voice coil would be effectively absorbed by the increased impedance. The shorting turns cause the impedance to flatten out, as shown in FIG. 8, leaving much of the power applied to the voice coil available to move the spool element 82. In fact, the flow of fluid for operation of the actuator mechanism 12 is still available at a frequency of 4,000 hertz. Although shorting coils have been used in prior electrodynamic apparatuses, it is believed to be novel to incorporate them in a speaker coil type servovalve utilized in a system of this type.

Referring again to FIG. 7, the four-way sliding valve 74 may comprise a conventional spool valve wherein the spool element 82 is closely received within a central bore 106. The central bore 106 is provided with spaced apart annular grooves 108, 110 and 112 which may be entirely covered by corresponding shoulders 114, 116 and 118 of the spool element 82 in the closed condition of the valve. Pressurized supply fluid ($P_s$) is supplied to the groove 110 through a passage 120, and the grooves 108 and 112 are connected to a fluid return ($P_R$) through a system of passages 122. The passages 54 and 56 communicating with the chambers 36 and 38, respectively, communicate with the central bore 106 at locations between adjoining pairs of the annular grooves 108, 110 and 112. Because the spool element 82 is of a reduced diameter at locations between the shoulders 114, 116 and 118, axial movement of the spool element to the right or left establishes paths for fluid flow in the manner of FIGS. 7A and 7B, respectively. The valve orifices are formed between the edges of the grooves 108 through 112 and the corresponding shoulders of the spool element. The amount of flow through the orifices is generally proportional to the axial displacement of the spool element. As further shown in FIG. 7, the spool element 82 and the attached movable cone structure 90 are biased to the null condition of FIG. 7 by a pair of springs 124.

The voice coil apparatus 72 is located generally within a housing 126 which contains the magnetic poles 84 and 86 and the movable cone structure 90, and adjoins the sliding valve 74. In operation, it has been discovered that hydraulic fluid leaking between the spool element 82 and the central bore 106 has a tendency to be retained within the housing and to cause unpredictable and unreliable operation of the servovalve 14. In order to overcome this, a flow of air, as shown by the arrows 128, is introduced to the interior of the housing 126 through one or more passages 130. The air is introduced under very low pressure to expel the excess fluid through a drain 132. The flow of air is preferably on the order of ½ cubic foot per minute. It fills the space between the north pole and the cone and between the south pole and the voice coil 76. It also passes through openings in the cone, filling the interior of the housing 126 with air. This flow of air effectively purges the housing of any hydraulic fluid leakage, causing leaked fluid to pass through the drain 132 to an accumulator apparatus (not shown). In addition, the flow of air maintains the voice coil and the adjoining structure cool.

Although the servovalve 14 is described herein as providing pressurized fluid directly to the actuator mechanism 14, it will be understood that a conventional slave valve can be interposed between the servovalve and the actuator mechanism, if desired.

As shown in FIGS. 1 and 3, the actuator mechanism 12 is preferably positioned vertically with the table 20 at the upper end thereof, a reaction mass 136 being carried at the lower end of the base 64 to provide inertial resistance against which the actuator mechanism 12 can operate. The reaction mass 136, the actuator mechanism 12 and the servovalve 14 are all preferably suspended by a series of springs 138 for isolating the apparatus 10 from its environment. The springs 138 are preferably suspended from an upper end of a cart or other support element 140.

The control apparatus 16 may be any conventional apparatus able to produce an output in the form of a complex waveform 22 capable of causing the servovalve 14 and the actuator mechanism 12 to produce an output acceleration similar to that which the test specimen 18 would see in its natural environment. The program source may be tape recorded random signals, a random noise source with manual equalizing filters, or an automatic digital random controller. During operation, the control apparatus 16 can constantly monitor the position of the piston 30 of the actuator mechanism 12, correcting the input waveform 22 to maintain the piston 30 essentially centered about its range of travel. Thus, FIG. 2 illustrates a position signal applied along a feedback path 142 to control the input to the servovalve 14. The circuitry of the apparatus 16 for achieving this control may comprise any known feedback control circuit suitable for the purpose.

The plurality of accelerometers 24 discussed above are positioned relative to the table 20 and the specimen 18 at a plurality of different locations to sense the average level of acceleration undergone by the specimen. The accelerometers are positioned asymmetrically relative to the axis of the table, eliminating the possibility that the signals from the accelerometers might cancel each other out. Referring to the display panel 28, the RMS acceleration is visually indicated on a meter 144, while any deviation from a preselected range of acceleration values is indicated by a plurality of lights 146. A switch 148 is actuable from a first position at which an audible alarm is sounded if the acceleration deviates from the preselected range, to a second condition in which the apparatus 10 will be automatically shut down by any such deviation.

The apparatus 10 is designed specifically for operation by production line workers and others of limited training to determine whether a manufactured product possesses latent defect which might cause it to fail prematurely in its natural environment. All that is required of the operator is the ability to affix the test specimen 18 to the table 20 and activate the control apparatus 16 to begin the testing cycle. As described above, the control apparatus 16 acts automatically to maintain the piston 30 of the actuator mechanism 12 near the center of its range of travel, and to monitor the acceleration forces produced. As the waveform 22 is applied to the voice coil 76 of the servomechanism, the spool element 82 is actuated axially in a similar manner between the conditions of FIG. 7A and FIG. 7B. The piston 30 of the mechanism 12 is actuated axially by the output of the servovalve 14, producing vibrational forces which accelerate the test specimen 18 in alternate directions. The apparatus 10 can be operated at any desired frequency up to and including approximately 4,000 hertz. For example, many military items must be tested to withstand vibrations of a given frequency, typically 810 hertz or 781 hertz. The apparatus 10 is operable in this frequency range to produce substantial accelerations of the test specimen 18. As the frequency is increased above approximately 1,000 hertz, the acceleration imparted to the test specimen 18 begins to decrease rather rapidly, as illustrated in FIG. 4. However, the tuned actuator mechanism of the present invention provides an extra "kick" at the preselected resonant frequency, typically 2,000 hertz, permitting vibrational test screening to be accomplished at frequencies in that range, as well.

It will be understood that while the location of the masses $M_1$ and $M_2$ can be varied relative to the piston rods 42 and 44 by threading the particular masses to different locations on the rods, the masses $M_1$ and $M_2$ will typically be installed upon initial assembly of the apparatus 10 at preselected locations to yield the desired resonant frequencies. These locations are calculated from the physical dimensions and characteristics of the masses and the piston rods, and later fine tuned empirically. Once the optimal locations are determined, future mechanisms can be assembled to those dimensions without further adjustment.

It will be further understood that the pressurized hydraulic fluid $P_s$ applied to the passage 120 of the sliding valve 74, and the flow of air 128, may be supplied by conventional means (not shown). Similarly, the return fluid $P_R$ may be collected by conventional means.

From the above, it can be seen that there has been provided a simple and effective apparatus for imparting preselected vibrational forces to a test specimen over a wide range of frequencies. The apparatus is a true production line device which can be operated by a worker of very little training without the expenditure of a substantial amount of time.

What is claimed is:

1. Apparatus for subjecting a test specimen to vibrational forces, comprising:
   a base;
   first and second preselected masses;
   means for mounting the first and second masses for reciprocal movement relative to the base;
   means for attaching a test specimen to the first mass for movement therewith;
   means for actuating the first and second masses reciprocally;
   the mounting means comprising first and second rods extending substantially parallel to the direction of reciprocal movement to elastically couple the actuating means to the first and second masses, respectively;
   means for threading the first and second masses onto the first and second rods, respectively; and
   means for locking the masses at preselected locations on the rods, the locking means including a pair of collars threaded onto the respective rods and means for urging the first and second masses axially relative to the collars.

2. The apparatus recited in claim 1 wherein the urging means comprises screw thread means connecting each of the masses to one of the collars at a location spaced radially from the corresponding rods.

* * * * *